`United States Patent Office`

2,870,109
Patented Jan. 20, 1959

2,870,109

COATED SILICA AEROGEL, SILICONE RUBBER REINFORCED THEREWITH AND METHOD OF MAKING

Ralph F. Nickerson, Marblehead, Mass., assignor to Monsanto Chemical Company, St. Louis, Mo., a corporation of Delaware No Drawing. Application May 6, 1954
Serial No. 428,116

16 Claims. (Cl. 260—29.1)

The present invention relates to improvements in silicone rubber compositions, particularly reinforced silicone rubber compositions, and to processes of preparing such compositions. The present invention also relates to improved fillers for use in reinforcing silicone rubbers, and processes of preparing such fillers.

It has been proposed heretofore to incorporate silica aerogels in silicone or siloxane rubbers or elastomers as a reinforcing filler. Silica aerogels of relatively high acid content or relatively high acid number can be incorporated in silicone gums, prior to curing, by milling. Moreover, the mixtures thus formed may be aged and then remilled prior to curing without appreciable difficulty. However, after the composition is cured to form an elastic rubber composition or article, the article loses considerable weight on standing or during use at high temperatures, for example, 400 to 500° F. On the other hand, silica aerogels which are neutral or contain only relatively small amounts of acid can be incorporated in silicone gums prior to curing, but the resulting composition cures to some extent on aging and either cannot be remilled or can only be remilled with great difficulty prior to the final curing operation. In accordance with the present invention, it is possible to overcome the disadvantages heretofore encountered with the use of silica aerogel reinforcing fillers which are neutral to slightly acid, and it is also possible to prepare reinforced silicone rubbers which are superior in physical properties to and exhibit less weight loss at high temperatures than silicone rubbers reinforced with silica aerogels containing relatively higher amounts of acid constituents.

It is one object of this invention to provide novel silica aerogel reinforcing fillers which are particularly suitable for use in the production of silicone rubbers.

It is a further object of this invention to provide a process of preparing novel silica aerogel reinforcing fillers.

It is a further object of this invention to provide novel reinforced silicone rubber compositions having improved physical properties and which do not exhibit detrimental weight loss.

It is a further object of this invention to provide a process of producing novel reinforced silicone rubber compositions having improved physical properties and low weight loss characteristics.

Still further objects and advantages of the present invention will become apparent from the following description and the appended claims.

It has presently been found that when a silica aerogel having an acid number below 0.8 is rendered at least partially hydrophobic by treatment with a silicone oil, while retaining the aerogel structure, that its properties as a reinforcing filler for silicone gums or rubbers are considerably superior to those of the untreated silica aerogel or to those of a silica aerogel which has a higher acid number. Thus, silica aerogels per se having an acid number below 0.8 are not satisfactory from the standpoint of the remilling of a silicone gum-silica aerogel mix which has been allowed to age prior to curing, while the silica aerogels which have an acid number above 0.8 cause excessive weight losses at high temperatures in a silicone rubber containing such aerogels as the reinforcing filler. The silica aerogels of this invention, on the other hand, do not have either of these disadvantages.

The term "acid number" as used herein is intended to mean the number of milligrams of KOH required to neutralize one gram of silica aerogel to a pH of 5.2. This acid number of a silica aerogel is suitably determined by thoroughly mixing 4 grams of dry silica aerogel with 100 milliliters of distilled water and then titrating the resulting suspension with 0.01 N sodium hydroxide to a pH of 5.2 as measured by glass electrodes which have been previously standardized against an aqueous buffer solution at a pH of 4.0. The acid number is calculated by the following equation:

$$\frac{\text{Milliliters of NaOH solution} \times N \times 0.0561 \times 1000}{4} =$$

milligrams of KOH per gram of silica aerogel or acid number

In the above equation N represents the normality of the NaOH solution.

The silica aerogels having an acid number below 0.8, or ranging from 0.1 to 0.79, may be rendered partially to completely hydrophobic by treatment with silicone oils in various ways. Thus, the silica aerogels may be immersed in a substantially anhydrous solution of a silicone oil in an organic liquid which is a solvent for the silicone oil and the resulting mixture may be allowed to stand, after removal from solution, until a dry or substantially dry coated silica aerogel is obtained. The resulting product is then comminuted or ground, preferably in an air attrition mill, and consists of solid silica aerogel particles which are coated with a film of the silicone oil. The structure of the initial silica aerogel is largely retained in the final product. The extent to which the silica aerogel is rendered hydrophobic depends primarily on the concentration of the silicone oil in the solution. The best silica aerogel fillers are those which are hydrophobic and these are preferred.

The silica aerogels having an acid number below 0.8 may also be treated during a comminuting operation with a fine spray comprising droplets of the silicone oil or droplets of a substantially anhydrous solution of the silicone oil in an organic liquid which is a solvent for the silicone oil. It is possible to maintain the silica aerogel particles in a free-flowing condition during the grinding or comminuting operation by controlling the number of droplets applied to the silica aerogel. The grinding or comminuting operation is preferably carried out using an air grinding or air attrition mill, for example, of the type illustrated in Figure 51 on page 1145 of Chemical Engineers' Handbook (3rd edition) published by McGraw-Hill of New York, New York. The grinding or comminuting is preferably carried out in an atmosphere of air which is at a temperature varying from room temperature to just below the decomposition temperature of the silicone oil. Suitable air temperatures for this purpose are between about 80 and 300° F. The product obtained by this procedure is comparable to the product produced by the immersion treatment described in the preceding paragraph, but the application during the grinding or comminuting is more economical and is therefore preferred over the immersion process. Moreover, the application of the silicone oil during the grinding or comminuting operation has an advantage over the immersion process since the former process does not alter the physical properties of the aerogel whereas an immersion process has a tendency to shrink the aerogel to some extent and thus alter the physical properties of the aerogel.

The rate at which the spray of the silicone oil or solution thereof is applied to the silica aerogel may be varied depending on the concentration of silicone oil in the spray, the properties of the product desired and the amount of silica aerogel being treated. In general, the silicone oil is applied in droplets at the rate of about 5 to 40 parts by weight per 100 parts by weight of silica aerogel, although these rates and proportions may be varied considerably depending on the product desired and the concentration of the silicone oil in the droplets applied.

The silica aerogels having an acid number below 0.8 may also be rendered partially to completely hydrophobic after such aerogels have been formed in an autoclave by treatment with vapors of a silicone oil or by treatment with a spray of fine droplets of silicone oil or by treatment with a spray of fine droplets consisting of a silicone oil and a substantially anhydrous liquid which is a solvent for such oil. The treatment is continued until the silica aerogel is rendered partially to completely hydrophobic and thereafter the silica aerogel is removed from the autoclave and is comminuted or ground.

The hydrophobic properties of the treated silica aerogels may be improved by heating at elevated temperatures for varying periods of time. For example, the treated silica aerogels may be heated at atmospheric or subatmospheric pressure at temperatures of 80 to 600° C. for periods of 5 minutes to 24 hours, with the longer periods corresponding to the lower temperatures.

In coating the silica aerogels with silicone oils, the amount of silicone oil applied may be varied depending on whether a partially or completely hydrophobic product is desired. In those instances where partially hydrophobic products are desired, it is usually possible to achieve this result by applying from about 1 to 8% by weight of the silicone oil, based on the silica aerogel. In this case, the silica aerogel particles have a discontinuous coating or film of the silicone oil. Usually the best partially hydrophobic products are those which contain from about 4 to 8% by weight of the silicone oil, based on the silica aerogel, and these are preferred over other partially hydrophobic silica aerogels, particularly as reinforcing fillers for the production of reinforced silicone rubbers. When completely hydrophobic products are desired, it is usually desirable to apply more than 8% by weight and up to 20% by weight of the silicone oil based on the silica aerogel. In such instances, the silica aerogel particles have a continuous or substantially continuous coating or film of the silicone oil. Usually the best completely hydrophobic products are those which contain from about 10 to 16% by weight of the silicone oil based on the silica aerogel and these are preferred over other hydrophobic silica aerogels, particularly as reinforcing fillers for silicone rubbers. It is thus seen that, in general, the amount of silicone oil applied varies from about 1 to 20% by weight based on the silica aerogel and is dependent on the properties desired.

The silica aerogels which are coated with silicone oils as described herein have an acid number below 0.8 as hereinbefore defined, and although such silica aerogels may vary in their physical properties, it is desirable to employ silica aerogels having a surface area of at least 80 square meters per gram, as measured by the method of Brunauer, Emmett and Teller described in the advances in Colloid Science, volume I, pages 1–36 (1942), published by Interscience Publishers, Inc., New York, New York, preferably a surface area between 100 and 600 square meters per gram. It is also desirable to use silica aerogels having an aggregate particle size between 0.01 and 15 microns, and preferably consisting of particles of which at least 70% are between 1 and 5 microns, about 10% are below 1 micron and the remainder between 6 and 15 microns. It is also desirable to employ silica aerogels which have a white color in bulk or appear to be transparent to slightly translucent as individual particles, and which also have a bulk density below 10 pounds per cubic foot, preferably between 2 and 7 pounds per cubic foot. It has also been found to be desirable to employ silica aerogels having an ultimate particle size between about 5 and 40 millimicrons. The ultimate particle size is the size of the average particle, as delineated by an electron microscope, in a silicone rubber prepared by thorough milling of the silica aerogel in a silicone gum followed by the curing or vulcanization of the gum.

The silicone oils used for coating the silica aerogels comprise the oils prepared by the hydrolysis of dialkyl dihalosilanes or dialkyldialkoxysilanes, or the oils prepared by the cohydrolysis of dialkyldihalosilanes or dialkyldialkoxysilanes with trialkylmonohalosilanes or trialkylmonoalkoxysilanes. A particularly suitable class of silicone oils are the methyl silicone oils which are prepared by the hydrolysis of dimethyldichlorsilane, or by the cohydrolysis of dimethyldichlorsilane and trimethylchlorsilane or by the catalytic equilibration of a mixture of cyclic dimethylsiloxanes and hexamethyldisiloxane with a minor proportion of sulfuric acid. Such methyl silicone oils and methods for preparing methyl silicone oils are described on pages 82 through 88 of "The Chemistry of the Silicones" by Rochow, (1951), 2nd edition, published by John Wiley and Sons, Inc., of New York.

The treated or coated silica aerogels of this invention may be incorporated in a large variety of vulcanizable or silicone rubber-forming silicone or siloxane gums for the preparation of reinforced silicone or siloxane rubbers or elastomers having superior physical properties and exceedingly low weight loss on heating during storage or use, and this may be accomplished in various ways. Thus, the treated or coated silica aerogel may be incorporated in the silicone gum by compounding with differential rubber rolls or by mixing in a Banbury or Baker-Perkins dough mixer or by using conventional milling equipment. The compounding of these ingredients may be carried out in the presence of a silicone vulcanizing agent such as a peroxide as, for example, benzoyl peroxide, or a perbenzoate such as tertiary butyl perbenzoate and the resulting mixture may then be cured or vulcanized by heating at a temperature above 110° C., but below the thermal decomposition temperature of the silicone gum to form the reinforced silicone rubber product. However, the full advantages of the treated or coated silica aerogels of this invention are only obtained when the initial compounded mixture of the silicone gum and the treated silica aerogel is allowed to age at temperatures below the curing or vulcanizing temperature and is then remilled prior to the curing or vulcanizing step. Accordingly, the present invention is directed primarily to the manufacture of reinforced silicone or siloxane rubbers where such aging and remilling steps are carried out prior to curing or vulcanization of the silicone gum-silica aerogel mixture. In such procedure, the aging period and temperatures may vary considerably and are not particularly critical. Usually, the aging period is more than 5 days and generally from 7 to 100 days at temperatures of about 60 to 100° F.

The weight ratio of treated silica aerogel to silicone gum employed in preparing the reinforced silicone rubbers may be varied considerably depending on the physical properties desired in the cured or vulcanized rubber. However, for most purposes satisfactory results are obtained by using from about 15 to about 55 parts by weight of treated silica aerogel for every 100 parts by weight of silicone gum. Best results are usually obtained by employing from about 25 to 50 parts by weight of silica aerogel for every 100 parts by weight of silicone gum and such amounts are, accordingly, preferred. Of course, other reinforcing fillers for silicone rubbers may be used to replace part of the treated silica aerogel filler, but in such cases at least 10 parts by weight of the treated silica aerogel per 100 parts by weight of silicone gum should be employed in order to obtain the advantages of the treated silica aerogel filler.

The amount of vulcanizing agent used and the particular vulcanization temperature employed may be varied considerably as will be apparent to those skilled in the silicone rubber art. Thus, it is possible to use from about 1 to 6 parts by weight of vulcanizing agent per 100 parts of silicone gum, and the vulcanization or curing of the silicone gum-treated silica aerogel mixture may be carried out at temperatures between about 110 and 225° C.

A large variety of silicone gums may be used in combination with the treated silica aerogels to provide elastic or rubbery products. For example, it is possible to use the organo-polysiloxanes gums or gels in which silicon atoms are connected to each other by oxygen atoms through silicon-oxygen linkages.

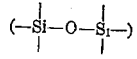

and which have an average of 1.75 to 2.25 monovalent organic radicals attached through carbon-silicon linkages to each silicon atom, such as those described in U. S. Patent No. 2,460,795. Of these organo-polysiloxanes, those which contain an average ratio of from about 1.95 to 2.0 monovalent organic groups per silicon atom are preferred. A particularly suitable class of silicone gums are the methyl silicone gums prepared by heating the hydrolyzate of a very pure dimethyl dichlorosilane in the presence of a small amount of an agent which is capable of increasing the molecular weight of the hydrolyzate without inducing cross-linking. As examples of such agents may be mentioned iron chloride, sodium hydroxide, potassium hydroxide and sulfuric acid. After the gum is formed, it is washed to remove such agent, and the resulting gum may be dried and then compounded with the treated silica aerogel. The methyl silicone gums are also known as dimethylpolysiloxanes.

Silicone gums prepared by the copolymerization of at least 90% dimethylsiloxane and not more than 10% of a different diorgano-siloxane such as diphenyl siloxane may also be employed with the treated silica aerogel fillers of this invention to provide valuable reinforced silicone rubbers.

The reinforced silicone rubbers of this invention comprise a vulcanized silicone rubber in which is embedded fine particles, usually below 1 micron, and, preferably having an ultimate particle size between 5 and 40 millimicrons, of a partially to completely hydrophobic silica aerogel having an acid number below 0.8, as hereinbefore defined. Such products have markedly superior physical properties as compared to silicone rubbers containing an uncoated or untreated silica aerogel having the same acid number. Moreover, the reinforced silicone rubber products of this invention do not exhibit detrimental weight loss as in the case of silicone rubbers reinforced with untreated or treated silica having an acid number above 0.8.

A further understanding of the products and processes of the present invention will be obtained from the following specific examples which are intended to illustrate this invention but not to limit the scope thereof, parts and percentages being by weight.

*Example I*

Two hundred parts of silica aerogel particles having an aggregate particle size below 5 microns, an acid number of 0.6 and a surface area of about 175 square meters per gram (as determined by the apparatus and procedure described on pages 3 through 6 of "Advance in Colloid Science" (1942), published by Interscience Publishers, Inc., New York, New York), were mixed thoroughly with a solution of 20 parts of n-butyl ether, 500 parts of diethyl ether and 10 parts of methyl silicone oil having a flash point of 578° F., a density of 8.58 pounds per gallon, a pour point below 120° F. and a viscosity in centistokes of 40 at 100° F. The resulting mixture, which was in the form of a paste, was allowed to stand until it was substantially free of the ether solvents. This product was then comminuted until particles of the original silica aerogel aggregate size were obtained. The comminuted coated silica aerogel particles were partially hydrophobic, had substantially the same structure as the initial aerogel and contained 5% silicone oil.

Forty parts of the coated silica aerogel, prepared as described immediately above, were milled with 100 parts of a water-white, putty-like dimethylpolysiloxane gum in the presence of 1% of benzoyl peroxide, based on the total ingredients, until a uniform mixture was obtained. This mixture was allowed to age for 168 hours at 80° F. and was then remilled and cured at a temperature of 150° C. for 1 hour. The resulting product comprised a dimethyl polysiloxane rubber containing silica aerogel particles coated with silicone oil and having an acid number below 0.8 and an ultimate particle size of 30 millicrons. This product had a tensile strength over 1000 pounds per square inch and an elongation over 500%, whereas a mixture prepared from the same dimethyl polysiloxane gum and an untreated silica aerogel having an acid number of 0.6 could not be remilled after aging for 48 hours, and, hence, gave a product which was not suitable as a silicone rubber.

A reinforced silicone rubber prepared in the same way as described above but using an uncoated silica aerogel having an acid number of 1.1 had only a tensile strength of about 700 pounds per square inch and an elongation of about 250%.

*Example II*

Two hundred parts of silica aerogel particles having an aggregate particle size below 5 microns (specifically between 1 and 3 microns), an acid number of 0.6 and a surface area of about 175 square meters per gram, were mixed thoroughly with a solution of 40 parts of n-butyl, 500 parts of diethyl ether and 20 parts of methyl silicone oil having a flash point of 578° F., a density of 8.58 pounds per gallon, a pour point below 120° F. and a viscosity in centistokes of 40 at 100° F. The resulting mixture, which was in the form of a paste, was allowed to stand until it was substantially free of the ether solvents. This product was then comminuted until particles of the original silica aerogel aggregate size were obtained. The comminuted coated silica aerogel particles were completely hydrophobic and contained 10% silicone oil. When used as a reinforcing filler in silicone rubbers this product gave results which were comparable to those obtained with the partially hydrophobic silica aerogel particles prepared according to the procedure set forth in the first paragraph of Example I.

*Example III*

Particles of silica aerogel having an acid number of 0.6 and a surface area of about 140 square meters per gram were supplied to a small grinding device of the type illustrated in Figure 51 on page 1145 of Chemical Engineers' Handbook (3rd edition), published by McGraw-Hill of New York, at the rate of 56 grams per minute for a period of 25 minutes. Simultaneously, a mixture of 200 grams of ligroin and 200 grams of methyl silicone oil having a flash point of 578° F., a density of 8.58 pounds per gallon, a pour point below 120° F. and a viscosity in centistokes of 40 at 100° F., was sprayed into a straight section of the grinding device at the rate of 16 grams per minute over the same 25 minute period. Grinding was carried out by using air at the rate of 80 cubic feet per minute. At the end of this period of time, grinding of the silica aerogel particles was discontinued. The silica aerogel particles collected from the grinding device had an average particle size between 1 and 3 microns and a coating of silicone oil which comprised about 10% of the coated particle weight and the particles were partially hydrophobic. When these particles were heated in an oven at 120° C. for a period of 12 hours they became completely hydrophobic.

When the coated, completely hydrophobic silica aerogels, prepared as described immediately above, were incorporated in a dimethylpolysiloxane gum and then aged, remilled and vulcanized according to the procedure of the second paragraph of Example I, the reinforced silicone rubber thus produced had substantially the same properties as a reinforced silicone rubber containing the coated silica aerogel particles of Example II.

The silica aerogel employed in the foregoing examples was prepared according to the following procedure. Two thousand parts of water were mixed with 1175 parts of 93% sulfuric acid, after which 1800 parts of a sodium silicate solution containing 20.2% of silica ($SiO_2$) were added to the sulfuric acid-water solution with vigorous agitation to provide an acidic silica aquasol containing 15.8% $SiO_2$ and having a pH of 2.7 (glass electrode). Two hundred and seventy-nine parts of 95% ethyl alcohol were added to the silica aquasol with vigorous stirring, after which 180 parts and 1535 parts, respectively, of the 95% ethyl alcohol were added with vigorous stirring to form an alcosol containing 8.6% $SiO_2$ and 5.9% $Na_2SO_4$. The temperature of this alcosol was about 50° F. The alcosol was then centrifuged to remove $Na_2SO_4 \cdot 10H_2O$ crystals, and the centrifuged alcosol was then adjusted to a pH of 3.6 (glass electrode) by adding, with vigorous agitation, a 10% aqueous solution of sodium bicarbonate. The resulting alcosol was then rapidly heated in an autoclave above the critical temperature of the alcohol-water vehicle in the alcosol, and the pressure in the autoclave was allowed to rise above the critical pressure of the liquid while allowing vapor to slowly escape from the autoclave to avoid excessive pressure. In this way, the internal structure of the gel formed during the autoclaving was preserved without appreciable shrinkage. The silica aerogel product in the autoclave was then comminuted to the described particle size.

Suitable starting silica aerogels for use in this invention may also be prepared by the processes described in the White Patent No. 2,285,477, the Marshall Patent No. 2,285,449 and the Kistler Patent No. 2,093,454. However, not all silica aerogels produced by the processes of the foregoing patents have an acid number below 0.8, and, therefore, it is necessary when using starting silica aerogels prepared by such processes to select only those silica aerogels which have an acid number (as hereinbefore defined) below 0.8 for use in the present invention.

This application is a continuation-in-part of my copending application Serial No. 349,309, filed April 16, 1953, now abandoned.

What is claimed is:

1. Silica aerogel particles having an acid number of 0.1 and higher but below 0.8 and a coating of a dimethyl silicone oil prepared by the acid hydrolysis of dimethyldichlorosilane, said particles being further characterized in that they are partially to completely hydrophobic and contain from 1 to 20% by weight of said oil, based on the silica aerogel.

2. Silica aerogel particles having an acid number of 0.1 and higher but below 0.8 and coated with from 4 to 8% by weight of a dimethyl silicone oil prepared by the acid hydrolysis of dimethyldichlorosilane.

3. A composition of matter comprising a reinforced, vulcanized dimethyl silicone rubber containing partially to completely hydrophobic silica aerogel particles having an acid number of 0.1 and higher but below 0.8 and a coating of more than 8% and up to 20% by weight, based on said particles, of dimethyl silicone oil prepared by the acid hydrolysis of dimethyldichlorosilane, said composition containing from 25 to 50 parts by weight of said particles for each 100 parts of said dimethyl silicone rubber.

4. A composition of matter comprising a reinforced, vulcanized dimethyl silicone rubber containing partially to completely hydrophobic silica aerogel particles having an acid number of 0.1 and higher but below 0.8 and a coating of 1 to 20% by weight, based on the silica aerogel, of a dimethyl silicone oil prepared by the acid hydrolysis of dimethyldichlorosilane.

5. A process of producing silica aerogel particles which are especially suitable for reinforcing silicone rubbers which comprises applying a silicone oil to silica aerogel particles having an acid number of 0.1 and higher but below 0.8 in amounts of 1 to 20% by weight, based on the silica aerogel, and until the silica aerogel particles are rendered partially to completely hydrophobic and comminuting said aerogel particles until they are of a smaller size than the initial particles, at least part of the comminution of the particles being carried out subsequent to the application of said silicone oil thereto, said silicone oil being selected from the group consisting of (1) a silicone oil prepared by the acid hydrolysis of a dialkyldihalosilane, (2) a silicone oil prepared by the acid hydrolysis of a dialkyldialkoxysilane, (3) a silicone oil prepared by the acid cohydrolysis of a dialkyldihalosilane with a trialkylmonohalosilane, (4) a silicone oil prepared by the acid cohydrolysis of a dialkylhalosilane with a trialkylmonoalkoxysilane, (5) a silicone oil prepared by the acid cohydrolysis of a dialkyldialkoxysilane with a trialkylmonohalosilane and (6) a silicone oil prepared by the acid cohydrolysis of a dialkyldialkoxysilane with a trialkylmonoalkoxysilane.

6. A process of producing silica aerogel particles which are especially suitable for reinforcing silicone rubbers which comprises coating silica aerogel particles having an acid number of 0.1 and higher but below 0.8 with a substantially anhydrous solution of a silicone oil in an organic solvent for said oil, while retaining the structure of said silica aerogel, said silicone oil being applied in amounts of 1 to 20% by weight, based on said silica aerogel particles, allowing the silica aerogel particles to dry and thereafter comminuting the silica aerogel particles until smaller particles are obtained, said silicone oil being selected from the group consisting of (1) a silicone oil prepared by the acid hydrolysis of a dialkyldihalosilane, (2) a silicone oil prepared by the acid hydrolysis of a dialkyldialkoxysilane, (3) a silicone oil prepared by the acid cohydrolysis of a dialkyldihalosilane with a trialkylmonohalosilane, (4) a silicone oil prepared by the acid cohydrolysis of a dialkyldihalosilane with a trialkylmonoalkoxysilane, (5) a silicone oil prepared by the acid cohydrolysis of a dialkyldialkoxysilane with a trialkylmonohalosilane and (6) a silicone oil prepared by the acid cohydrolysis of a dialkyldialkoxysilane with a trialkylmonoalkoxysilane.

7. A process of producing silica aerogel particles which are especially suitable for reinforcing silicone rubbers which comprises comminuting silica aerogel particles having an acid number of 0.1 and higher but below 0.8 and concurrently spraying said aerogel particles with droplets containing a silicone oil until said silica aerogel particles are at least partially hydrophobic, while retaining the structure of said silica aerogel particles, said silicone oil being applied in amounts of 1 to 20% by weight, based on said aerogel particles, and being selected from the group consisting of (1) a silicone oil prepared by the acid hydrolysis of a dialkyldihalosilane, (2) a silicone oil prepared by the acid hydrolysis of a dialkyldialkoxysilane, (3) a silicone oil prepared by the acid cohydrolysis of a dialkyldihalosilane with a trialkylmonohalosilane, (4) a silicone oil prepared by the acid cohydrolysis of a dialkyldihalosilane with a trialkylmonoalkoxysilane, (5) a silicone oil prepared by the acid cohydrolysis of a dialkyldialkoxysilane with a trialkylmonohalosilane and (6) a silicone oil prepared by the acid cohydrolysis of a dialkyldialkoxysilane with a trialkylmonoalkoxysilane.

8. A process as in claim 7, but further characterized in that the silicone oil is a dimethyl silicone oil prepared by the acid hydrolysis of dimethyldichlorosilane.

9. A process of producing silica aerogel particles which are especially suitable for reinforcing silicone rubbers which comprises comminuting silica aerogel particles having an acid number of 0.1 and higher but below 0.8 and concurrently spraying said aerogel particles with droplets of a substantially anhydrous solution of a silicone oil in an organic solvent for said oil until said silica aerogel particles are at least partially hydrophobic, while retaining the structure of said aerogel particles, said silicone oil being applied in amounts of 1 to 20% by weight, based on said aerogel particles and being selected from the group consisting of (1) a silicone oil prepared by the acid hydrolysis of a dialkyldihalosilane, (2) a silicone oil prepared by the acid hydrolysis of a dialkyldialkoxysilane, (3) a silicone oil prepared by the acid cohydrolysis of a dialkyldihalosilane with a trialkylmonohalosilane, (4) a silicone oil prepared by the acid cohydrolysis of a dialkyldihalosilane with a trialkylmonoalkoxysilane, (5) a silicone oil prepared by the acid cohydrolysis of a dialkyldialkoxysilane with a trialkylmonohalosilane and (6) a silicone oil prepared by the acid cohydrolysis of a dialkyldialkoxysilane with a trialkylmonoalkoxysilane.

10. Silica aerogel particles having an acid number of 0.1 and higher but below 0.8 and a coating of a silicone oil, said particles being further characterized in that they are partially to completely hydrophobic and contain from 1 to 20% by weight of said oil, based on the silica aerogel, said silicone oil being selected from the group consisting of (1) a silicone oil prepared by the acid hydrolysis of a dialkyldihalosilane, (2) a silicone oil prepared by the acid hydrolysis of a dialkyldialkoxysilane, (3) a silicone oil prepared by the acid cohydrolysis of a dialkyldihalosilane with a trialkylmonohalosilane, (4) a silicone oil prepared by the acid cohydrolysis of a dialkyldihalosilane with a trialkylmonoalkoxysilane, (5) a silicone oil prepared by the acid cohydrolysis of a dialkyldialkoxysilane with a trialkylmonohalosilane and (6) a silicone oil prepared by the acid cohydrolysis of a dialkyldialkoxysilane with a trialkylmonoalkoxysilane.

11. A process of producing a reinforced silicone rubber which comprises incorporating partially to completely hydrophobic silica aerogel particles having an acid number of 0.1 and higher but below 0.8 and a coating of from 1 to 20% by weight, based on the silica aerogel, of a silicone oil, in a vulcanizable organopolysiloxane gum in which the silicon atoms are connected to each other through silicon-oxygen linkages and which has an average of 1.75 to 2.25 methyl radicals attached through carbon-silicon linkages to each silicon atom and thereafter vulcanizing the resulting mixture at a temperature above 110° C. but below the thermal decomposition temperature of said gum to form a rubber in the presence of a vulcanizing compound for said gum selected from the group consisting of peroxides and perbenzoates, said silicone oil being selected from the group consisting of (1) a silicone oil prepared by the acid hydrolysis of a dialkyldihalosilane, (2) a silicone oil prepared by the acid hydrolysis of a dialkyldialkoxysilane, (3) a silicone oil prepared by the acid cohydrolysis of a dialkyldihalosilane with a trialkylmonohalosilane, (4) a silicone oil prepared by the acid cohydrolysis of a dialkyldihalosilane with a trialkylmonoalkoxysilane, (5) a silicone oil prepared by the acid cohydrolysis of a dialkyldialkoxysilane with a alkylmonohalosilane and (6) a silicone oil prepared by thhe acid cohydrolysis of a dialkyldialkoxysilane with a trialkylmonoalkoxysilane.

12. A process of producing a reinforced silicone rubber which comprises incorporating partially to completely hydrophobic silica aerogel particles having an acid number of 0.1 and higher but below 0.8 and a coating of a silicone oil in the amount of 1 to 20% by weight, based on the silica aerogel, in a vulcanizable organo-polysiloxane gum in which the silicon atoms are connected to each other through silicon-oxygen linkages and which has an average of 1.75 to 2.25 methyl radicals attached through carbon-silicon linkages to each silicon atom in the presence of a vulcanizing compound for said gum selected from the group consisting of peroxides and perbenzoates, allowing the resulting mixture to age for a period of more than 5 days but not in excess of 100 days at temperatures between 60 and 100° F., milling the mixture and thereafter vulcanizing the mixture at a temperature above 110° C. but below the thermal decomposition temperature of said gum, said silicone oil being selected from the group consisting of (1) a silicone oil prepared by the acid hydrolysis of a dialkyldihalosilane, (2) a silicone oil prepared by the acid hydrolysis of a dialkyldialkoxysilane, (3) a silicone oil prepared by the acid cohydrolysis of a dialkyldihalosilane with a trialkylmonohalosilane, (4) a silicone oil prepared by the acid cohydrolysis of a dialkyldihalosilane with a trialkylmonoalkoxysilane, (5) a silicone oil prepared by the acid cohydrolysis of a dialkyldialkoxysilane with a trialkylmonohalosilane and (6) a silicone oil prepared by the acid cohydrolysis of a dialkyldialkoxysilane with a trialkylmonoalkoxysilane.

13. A process as in claim 12, but further characterized in that the silica aerogel particles have a coating of a dimethyl silicone oil prepared by the acid hydrolysis of dimethyldichlorosilane.

14. A process of producing a reinforced silicone rubber which comprises milling (a) from 15 to 55 parts by weight of partially to completely hydrophobic silica aerogel having an acid number of 0.1 and higher but below 0.8 and a coating of from 1 to 20% by weight, based on the silica aerogel, of a silicone oil selected from the group consisting of: (1) a silicone oil prepared by the acid hydrolysis of a dialkyldihalosilane, (2) a silicone oil prepared by the acid hydrolysis of a dialkyldialkoxysilane, (3) a silicone oil prepared by the acid cohydrolysis of a dialkyldihalosilane with a trialkylmonohalosilane, (4) a silicone oil prepared by the acid cohydrolysis of a dialkyldihalosilane with a trialkylmonoalkoxysilane, (5) a silicone oil prepared by the acid cohydrolysis of a dialkyldialkoxysilane with a trialkylmonohalosilane and (6) a silicone oil prepared by the acid cohydrolysis of a dialkyldialkoxysilane with a trialkylmonoalkoxysilane, and (b) 100 parts by weight of a vulcanizable dimethyl silicone gum in the presence of a vulcanizing compound for said gum selected from the group consisting of peroxides and perbenzoates, allowing the resulting mixture to age for a period of more than 5 days but not in excess of 100 days at temperatures between 60 and 100° F., remilling the mixture and thereafter vulcanizing the mixture at a temperature above 110° C. but below the thermal decomposition temperature of said gum to form a dimethyl silicone rubber.

15. A process as in claim 14, but further characterized in that the silicone oil is a dimethyl silicone oil prepared by the acid hydrolysis of dimethyldichlorosilane.

16. A silicone rubber prepared from a vulcanizable organo-polysiloxane gum in which the silicon atoms are connected to each other by silicon-oxygen linkages and which has an average of 1.75 to 2.25 methyl radicals attached through carbon-silicon linkages to each silicon atom, said rubber being reinforced with partially to completely hydrophobic silica aerogel particles having an acid number of 0.1 and higher but below 0.8 and a coating of 1 to 20% by weight, based on the silica aerogel, of a silicone oil selected from the group consisting of (1) a silicone oil prepared by the acid hydrolysis of a dialkyldihalosilane, (2) a silicone oil prepared by the acid hydrolysis of a dialkyldialkoxysilane, (3) a silicone oil prepared by the acid cohydrolysis of a dialkyldihalosilane with a trialkylmonohalosilane, (4) a silicone oil prepared by the acid cohydrolysis of a dialkyldihalosilane with a trialkylmonoalkoxysilane, (5) a silicone oil prepared by the acid cohydrolysis of a dialkyldialkoxysilane with a trialkylmonohalosilane and (6) a silicone oil prepared by the acid cohydrolysis of a dialkyldialkoxysilane with a trialkylmonoalkoxysilane.

References Cited in the file of this patent

UNITED STATES PATENTS

| | | |
|---|---|---|
| 2,428,608 | Bass | Oct. 7, 1947 |
| 2,563,555 | Safford | Aug. 7, 1951 |
| 2,567,315 | Bidaud | Sept. 11, 1951 |
| 2,568,672 | Warrick | Sept. 18, 1951 |
| 2,610,167 | Te Grotenhuis | Sept. 9, 1952 |
| 2,666,041 | Pfeifer | Jan. 12, 1954 |
| 2,744,079 | Kilbourne | May 1, 1956 |

OTHER REFERENCES

India Rubber World, vol. 129, No. 4, pages 481–484 (January 1954), page 482 relied on.